US011268970B2

(12) United States Patent
Zhang

(10) Patent No.: US 11,268,970 B2
(45) Date of Patent: Mar. 8, 2022

(54) AUTOMATIC ANALYSIS DEVICE AND SAMPLE ANALYSIS METHOD

(71) Applicant: Shenzhen Increcare Biotech Co., Ltd, Shenzhen (CN)

(72) Inventor: Zhen Zhang, Shenzhen (CN)

(73) Assignee: Shenzhen Increcare Biotech Co., Ltd, Shenzhen (CN)

( * ) Notice: Subject to any disclaimer, the term of this patent is extended or adjusted under 35 U.S.C. 154(b) by 370 days.

(21) Appl. No.: 16/475,802

(22) PCT Filed: Oct. 30, 2017

(86) PCT No.: PCT/CN2017/108329
§ 371 (c)(1),
(2) Date: Sep. 12, 2019

(87) PCT Pub. No.: WO2018/126775
PCT Pub. Date: Jul. 12, 2018

(65) Prior Publication Data
US 2020/0241021 A1 Jul. 30, 2020

(30) Foreign Application Priority Data
Jan. 6, 2017 (CN) .......................... 201710010516.8

(51) Int. Cl.
*G01N 35/00* (2006.01)
*G01N 35/04* (2006.01)

(52) U.S. Cl.
CPC ......... *G01N 35/0092* (2013.01); *G01N 35/04* (2013.01); *G01N 2035/00356* (2013.01); *G01N 2035/0441* (2013.01)

(58) Field of Classification Search
CPC .............. G01N 35/0092; G01N 35/04; G01N 2035/00356; G01N 2035/0441;
(Continued)

(56) References Cited

U.S. PATENT DOCUMENTS

| 4,857,471 A | 8/1989 | Salzman et al. |
| 2003/0092185 A1* | 5/2003 | Qureshi ............ G01N 35/0092 436/43 |
| 2014/0093975 A1 | 4/2014 | Wang et al. |

FOREIGN PATENT DOCUMENTS

| CN | 101965518 A | 2/2011 |
| CN | 103443629 A | 12/2013 |

(Continued)

OTHER PUBLICATIONS

Extended European Search Report for European Counterpart Application No. 17889823.5, dated Sep. 10, 2020, (14 pages).
(Continued)

*Primary Examiner* — Jill A Warden
*Assistant Examiner* — John McGuirk
(74) *Attorney, Agent, or Firm* — Kagan Binder, PLLC

(57) ABSTRACT

Disclosed is an automatic analysis device (100), including: a dispensing unit (20), configured to dispense a sample and/or a reagent into a reaction vessel; a reaction unit (10), configured to incubate the reactant in the reaction vessel and transfer the reaction vessel; a B/F unit (2), configured to wash the reactant in the reaction vessel; a detecting unit (1), configured to detect a reaction signal in the reaction vessel; wherein the reaction unit (10) includes one rotating device (11) provided with a reaction vessel position to bear and fix the reaction vessel. The technical solution of the disclosure eliminates the washing tray and the detecting tray, simplifies the system structure and the control flow, and also significantly reduces the size of the reaction unit (10), implements flexible incubation time, and improves the working efficiency of the analysis device (100).

3 Claims, 9 Drawing Sheets

(58) Field of Classification Search
CPC .. G01N 35/025; G01N 35/0098; G01N 35/02; G01N 2035/0444; G01N 2035/00326
See application file for complete search history.

(56) References Cited

FOREIGN PATENT DOCUMENTS

| | | | | |
|---|---|---|---|---|
| CN | 104345158 | A * | 2/2015 | ........... G01N 35/025 |
| CN | 104345158 | A | 2/2015 | |
| CN | 106199026 | A | 12/2016 | |
| CN | 106226541 | A | 12/2016 | |
| CN | 106645765 | A | 5/2017 | |
| CN | 106706942 | A | 5/2017 | |
| CN | 106841644 | A | 6/2017 | |
| EP | 0833278 | A2 | 4/1998 | |
| EP | 2690445 | A1 | 1/2014 | |
| JP | 5300447 | B2 | 9/2013 | |
| WO | 9322686 | A2 | 11/1993 | |
| WO | 2012130107 | A1 | 10/2012 | |
| WO | WO-2014169574 | A1 * | 10/2014 | ........... G01N 35/025 |
| WO | 2018126772 | A1 | 7/2018 | |
| WO | 2018126774 | A1 | 7/2018 | |

OTHER PUBLICATIONS

International Search Report, and English Translation thereof, for International Application No. PCT/CN2017/108329, dated Jan. 25, 2018 (6 pages).
Korean Office Action for Korean Counterpart Application No. 10-2019-7023076, dated Oct. 28, 2020, (5 pages).
Unpublished United States Utility U.S. Appl. No. 16/475,810, filed Jul. 3, 2019 (No Copy Enclosed).
Unpublished United States Utility U.S. Appl. No. 16/475,788, filed Jul. 3, 2019 (No Copy Enclosed).
Unpublished United States Utility U.S. Appl. No. 16/493,351, filed Sep. 12, 2019 (No Copy Enclosed).
Office Action for Chinese Counterpart Application No. 201710010516.8, dated Nov. 1, 2017, which cites to WO2012130107A1 (7 pages).

* cited by examiner

AUTOMATIC ANALYSIS DEVICE AND SAMPLE ANALYSIS METHOD

CROSS REFERENCE TO RELATED APPLICATIONS

The present disclosure is a national stage for International Application PCT/CN2017/108329, filed on Oct. 30, 2017, which claims priority benefit of Chinese Patent Application No. 201710010516.8 filed on Jan. 6, 2017, and entitled "Automatic Analysis Device and Sample Analysis Method", the entire contents of both applications are incorporated herein for all purposes.

TECHNICAL FIELD

The present disclosure relates to a field of in-vitro diagnostic equipment, in particular to an automatic analysis device and a sample analysis method.

BACKGROUND

In recent years, the development and advancement of clinical testing and automation technology has not only improved the automation level of the clinical laboratory and the efficiency of medical testing, but has also improved the quality and reliability of the test results. However, with the increase of the amount of the test specimens, the clinical laboratory is required to continually install large-scale automatic test systems to meet its test requirements, resulting in that the laboratory is increasingly crowded and the test costs are rising. Therefore, when facing the pressure and challenge of medical insurance control fee, how to improve the testing efficiency, ensure the results, make full use of the existing laboratory resources and reduce the test cost is an urgent problem to be solved by the clinical testing.

For the convenience of description, the present technical solution and method are illustrated in the context by taking a full-automatic immunoassay instrument in In-Vitro Diagnostics (IVD), in particular, a luminescent immunoassay analyzer as an example, and those skilled in the art can understand that the present solution and method can also be applied to other automatic apparatus of clinical testing, such as a fluorescent immunoassay device, an electrochemical immunization and the like. The full-automatic immunoassay analyzer associates an optical or electrical signal with an analyte concentration and the like though a series of cascade amplification reactions by labeling the antigen and antibody with enzyme markers, lanthanide markers or chemiluminescent agents on the basis of immunological reactions in which antigen and antibody bind to each other, to analyze the antigen or antibody to be tested in the human sample. Such full-automatic immunoassay is mainly used in the clinical lab of the hospital, the third-party independent laboratory, the blood test center, etc., to perform quantitative, semi-quantitative or qualitative analysis of various analytes in human body fluids so as to perform the diagnosis of infectious diseases, tumors, endocrine functions, cardiovascular diseases, prenatal and postnatal diseases, and autoimmune diseases. The full-automatic immunoassay analyzer usually consists of a sampling unit, a reaction unit, a supply and waste liquid unit, a system control unit and the like. At present, the luminescence immunoassay is becoming a mainstream technology of automatic immunoassay due to its advantages of quantitative detection, high sensitivity, good specificity, wide linear range and high degree of automation. The full-automatic luminescence immunoassay further includes enzymatic chemiluminescence, direct chemiluminescence, and electrochemiluminescence according to different marking methods and luminescence systems.

Referring to FIGS. 1-3, the luminescence immunoassay can be generally divided into a one-step protocol, a one-step delay protocol, a two-step protocol, etc. according to the test protocols. The main test steps generally include: dispensing a sample and a reagent, mixing the reactants, and incubating, washing and separating (Bound-Free, referred to as B/F or washing for short), dispensing a signal reagent, detecting, etc. It should be noted that the present invention distinguishes the reagent and the signal reagent, incubation and signal incubation for convenient presentation. There is a "one-to-one correspondence" relationship between the reagent and assay, that is, the specific reagents corresponding to different assays generally differ in formula, reagent volume, and component quantity. Depending on the different specific assays, the reagent typically includes multiple components, such as the usual 2-5 components, including reagent components such as magnetic particle reagent, enzyme labeled reagent, diluent and the like. According to the different reaction protocols, it is possible to dispense the multiple reagent components of one assay at one time or in multiple steps. When the dispensing is performed by multiple steps, the multiple reagent components can be defined as a first reagent, a second reagent, a third reagent and so on according to the order of dispensing. The signal reagent is configured to detect the generation of a signal, usually a kind of general-purpose reagent, and there is a "one-to-many" correspondence between the signal reagent and the assay, that is, different assays share the same signal reagent. The incubation of the present invention specifically refers to a process of antigen-antibody binding reaction or biotin-avidin binding reaction of the reactants in the constant temperature environment of the reaction unit in the reaction vessel before the start of bound-free. Specifically, for the one-step protocol, the incubation is performed once; for the one-step delay protocol, the incubation is performed two times, including a first incubation before dispensing the second reagent and a second incubation before entering into the bound-free; as for the two-step protocol, the incubation is performed two times, including a first incubation before a first bound-free and a second incubation before a second bound-free. The signal incubation refers to a process in which the signal reagent is dispensed into the reaction vessel after washing to react in a constant temperature environment for a period of time to enhance the signal. According to different reaction systems and luminescence principles, not all tests require the signal incubation, and a test requiring the signal incubation is typically chemiluminescence enzyme immunoassay. The test steps corresponding to different test protocols are detailed as follows.

1) The one-step protocol: with reference to FIG. 1, sample (S) and reagent (R) are dispensed, well mixed (some test protocols may not need to well mix, the same below, no longer repeat), incubated (usually 5-60 minutes), washed after the incubation is completed; a signal reagent is dispensed to perform the signal incubation (generally 1-6 minutes), and finally the detecting is performed. It should be pointed out that due to the different specific components of the signal reagents, some luminescence systems do not need the signal incubation, and can be directly detected during the process of dispensing the signal reagent or after dispensing the signal reagent. The signal reagent may be one or more. Referring to FIG. 2, the signal reagent includes a first signal reagent and a second signal reagent.

2) The one-step delay protocol: difference from the one-step protocol is that the reagent is dispensed twice; the first incubation is performed after the first reagent is dispensed and well mixed, and the second reagent is dispensed and well mixed after the first incubation is completed. Compared to the one-step protocol, the one-step delay protocol includes one more incubation and one more action of dispensing and well mixing reagent, and the rest of the process is the same as the one-step protocol.

3) The two-step protocol: difference from the one-step delay protocol is in that there is one more bound-free step, and the other steps are the same.

In order to complement the automatic test in the above-mentioned process, the existing specific implementation technical solutions are as follows.

The first existing technical solution separates the incubation, bound-free, and detection into separated layouts, the corresponding function of which are accomplished by three rotation trays, and the reaction vessel is transferred between different units by a mechanical gripper arm. The technical solution has many components and units, and the reaction vessel is needed to transfer between the units, resulting in problems of large volume, high cost and complicated control flows and so on.

A second existing technical solution arranges the incubation and detection together to form an incubation detecting unit, and the bound-free is performed by another separating unit. Compared to the first existing technical solution, although the second existing technical solution reduces one detecting disc and is advantageous to control the size and cost of the whole apparatus to a certain extent, the same problems as the first existing technical solution are still existed. In addition, in order to implement flexible incubation time, the incubation detecting unit is complicated to control, the incubation and detection are mutually constrained in control, and it is not easy to implement the high-speed automatic test.

A third existing technical solution implements the incubation, bound-free, and detection on a single-circle disc or a branch track. In order to support longer incubation times, the disc is needed to set a lot of incubation positions in addition to the positions of bound-free and detection, so that in order to implement the high-speed test, the size of the disc or the branch track is needed to design to be large, thus it is difficult to manufacture, and the cost is very high. In addition, in order to implement the tests of the one-step and two-step protocol, at least two dispensing sample mechanisms and at least two bound-free mechanisms are required, thereby increasing the material, processing, production cost and the apparatus overall size. On the other hand, this technical solution also limits the incubation time, resulting in problems such as a fixed incubation time and a long time waiting for a result.

SUMMARY

An objective of the present disclosure is to address the problems above and provide an automatic analysis apparatus and a sample analysis method with low manufacturing cost, simple and compact structure, flexible and high-efficient test process or method.

In order to achieve the above purpose, the disclosure provides an automatic analysis apparatus for detecting a target analyte in a sample, including: a dispensing unit configured to dispense a sample or/and a reagent into a reaction vessel: a reaction unit configured to incubate the reactant in the reaction vessel and transfer the reaction vessel; a bound-free (B/F) unit configured to wash the reactant in the reaction vessel: a detecting unit configured to detect a reaction signal in the reaction vessel; wherein the reaction unit includes one rotating apparatus on which a reaction vessel position is disposed to carry and fix the reaction vessel; the reaction vessel position includes a first reaction vessel position and a second reaction vessel position: the first reaction vessel position transfers the reaction vessel to the B/F unit or/and the detecting unit, the second reaction vessel position incubates the reactant in the reaction vessel; the incubation includes a second incubation of the reaction vessel which needs incubating twice; the B/F unit washes the reactant in the reaction vessel on the first reaction vessel position; the detecting unit detects the reaction signal in the reaction vessel on the first reaction vessel position.

According to another aspect of the disclosure, an automatic analysis apparatus for detecting a target analyte in a sample is provided, including: a dispensing unit configured to dispense a sample or/and a reagent into a reaction vessel; a reaction unit configured to incubate a reactant in the reaction vessel and transfer the reaction vessel; a B/F unit configured to wash the reactant in the reaction vessel; a detecting unit configured to detect a reaction signal in the reaction vessel; wherein the reaction unit includes one rotating apparatus on which a reaction vessel position is disposed to carry and fix the reaction vessel; the reaction vessel position includes a first reaction vessel position and a second reaction vessel position; the first reaction vessel position transfers the reaction vessel to the B/F unit or/and the detecting unit, the second reaction vessel position incubates the reactant in the reaction vessel including a reaction vessel which needs incubating twice; the B/F unit washes the reactant in the reaction vessel on the first reaction vessel position; the detecting unit includes a detecting position independent from the reaction unit, and detects the reaction signal in the reaction vessel on the detecting position.

According to another aspect of the disclosure, a sample analysis method is provided, including: a dispensing step: dispensing a sample or/and a reagent into a reaction vessel; an incubating step: incubating the reactant in the reaction vessel on a second reaction vessel position of a reaction unit; a bound-free step: washing, by a B/F unit, the reaction vessel on a first reaction vessel position of the reaction unit; a dispensing signal reagent step: dispensing a signal reagent into the reaction vessel on the first reaction vessel position of the reaction unit; a detecting step: detecting, by a detecting unit, a reaction signal in the reaction vessel on the first reaction vessel position of the reaction unit.

According to another aspect of the disclosure, a sample analysis method is provided, including: a dispensing step: dispensing a sample or/and a reagent into a reaction vessel; an incubating step: incubating a reaction vessel on a second reaction vessel position, the reaction vessel including a reaction vessel which needs incubating twice; a bound-free step: washing, by a B/F unit, the reaction vessel on a first reaction vessel position of the reaction unit; a dispensing signal reagent step: dispensing a signal reagent into the reaction vessel on the first reaction vessel position of the reaction unit or/and a reaction vessel on a detecting position independent from the reaction unit; a detecting step: detecting, by a detecting unit, a reaction signal in the reaction vessel on the detecting position independent from the reaction unit.

The technical solution of the present disclosure focuses on a reaction unit to implement the incubation, bound-free, and detection of the reactant in the reaction vessel. The reaction unit is provided with the first reaction vessel position and the second reaction vessel position. The first reaction vessel position transfers the reaction vessel to the B/F unit to wash. The detecting unit detects the signal in the reaction vessel on the first reaction vessel position or the reaction vessel independent from the detecting position. The second reaction vessel position implements all or part of the incubation. The present disclosure not only omits the washing tray and the detecting tray, simplifies the system structure and the control workflow, but also significantly reduces the size of the reaction unit, implements flexible incubation time, and improves the working efficiency of the analysis apparatus, thereby well solving the technical problems of large size, slow detection speed and high cost of the conventional automatic instruments, not only saving the laboratory space, improving the test efficiency, but also being conducive to reduce expenses and the burden on the subject, and ultimately saving a lot of natural and social resources.

DETAILED DESCRIPTION OF DISCLOSED EMBODIMENTS

Figure 1:
FIG. 1 is a schematic diagram of a reaction mode of a one-step protocol.
Figure 2:
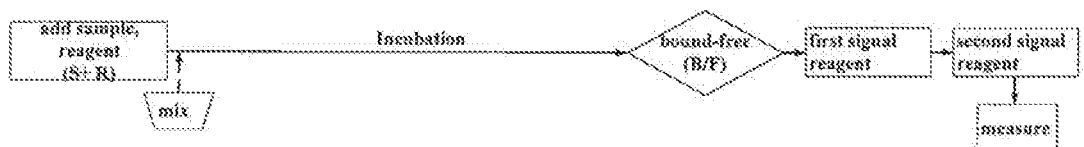
FIG. 2 is a schematic diagram of a reaction mode of a one-step protocol (another signal detecting mode)
Figure 3:
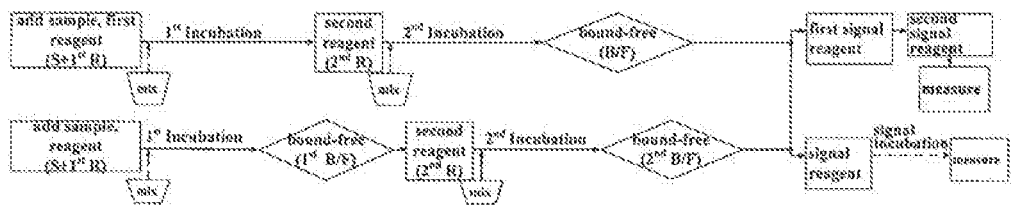
FIG. 3 is a schematic diagram of reaction modes of a one-step protocol and two-step protocol.

The present disclosure will be further detailed through specific embodiments with reference to the figures as follows.

An automatic analysis apparatus for detecting a target analyte in a sample according to the present disclosure includes: a dispensing unit configured to dispense a sample or/and a reagent into a reaction vessel; a reaction unit configured to incubate a reactant in the reaction vessel and transfer the reaction vessel; a B/F unit configured to wash the reactant in the reaction vessel; a detecting unit configured to detect a reaction signal in the reaction vessel. The reaction unit includes one rotating apparatus on which a reaction vessel position is disposed to carry and fix the reaction vessel. The reaction vessel position includes a first reaction vessel position and a second reaction vessel position. The first reaction vessel position transfers the reaction vessel to the B/F unit or/and the detecting unit, and the second reaction vessel position incubates the reactant in the reaction vessel. The incubation includes a second incubation of the reaction vessel which needs incubating twice. The B/F unit washes the reactants in the reaction vessel on the first reaction vessel position. The detecting unit detects the reaction signal in the reaction vessel on the first reaction vessel position.

The reaction vessel provides a reaction place for the reaction of the sample and the reagent, which may be a reaction tube, a reaction cup, a reaction cup with a plurality of chambers, a reaction chip, etc. with various shapes and structures, which are generally disposable. The reaction vessel is usually made of plastic, such as polystyrene. The reaction vessel may be coated with an antigen or an antibody on an inner wall thereof in advance, or may not be coated, or may have a coated magnetic bead or plastic ball stored therein in advance. The storage and supply of the reaction vessel is completed by a reaction vessel supply unit. The reaction vessel supply unit mainly adopts two major ways to store and supply the reaction vessel, one is a silo mode, in which the reaction vessels can be poured into a silo of the reaction vessel supply unit as a package in a scattered manner, and then the reaction vessel supply unit automatically sorts the reaction vessels one by one in sequence, and supplies the reaction vessels to a transferring unit; the other one is pre-arrangement mode, the reaction vessels are pre-arranged on a reaction vessel tray, box or a reaction vessel rack, channel, and the reaction vessel supply unit can put the whole tray and the whole box of the reaction vessels, or a row, a column of reaction vessels are conveyed to the target position.

The transferring of the reaction vessel between different positions in the apparatus of the disclosure can be completed by the transferring unit. The transferring unit can be any suitable mechanism capable of transferring or moving the reaction vessel. The preferred transferring unit of the present disclosure mainly includes a driving mechanism, a horizontal movement manipulator, a grip and release mechanism, and the like. The grip and release mechanism are usually mechanical fingers, which can gri and release the reaction vessel. The horizontal movement manipulator driven by the driving mechanism can move the grip and release mechanism along the X direction, the Y direction, the X direction and the Y direction, the radial direction, the circumferential direction, the radial direction and the circumferential direction and so on, and move the reaction vessels gripped by the grip and release mechanism to different locations. In addition to the horizontal movement, the transferring unit can also move up and down to place the reaction vessels into different locations or taking them out from different locations. According to the different test speed and overall layout, one or more transferring units can be provided.

The dispensing unit completes the dispensing of the sample and the reagent. The dispensing unit is generally composed of a steel needle or a disposable nozzle (tip), a dispensing movement driving mechanism, a syringe or a liquid charge pump, a valve, a fluid pipe, and a washing tank (or without a washing tank when a tip is used). In order to complete the suction of the sample and the reagent and the dispensing action thereof, the dispensing unit can move horizontally in addition to the up and down movement, and the horizontal movement usually has several movement forms, such as rotation, movement along X direction and Y direction, and the combination thereof. The dispensing unit can be one, which can dispense both the sample and the reagent, thus making the whole structure more compact and lower in cost. In order to increase the test speed, the dispensing unit may further include one or more sample dispensing units, one or more reagent dispensing units. The sample dispensing unit only dispenses the sample or dispenses the sample and a part of the reagents, and the reagent dispensing unit dispenses the reagents.

In order to facilitate the dispensing of the dispensing unit, the disclosure may also include a dispensing station. The dispensing station is positioned within the movement range of the transferring unit and the dispensing unit or can be moved into the movement range of the transferring unit and the dispensing unit by the horizontal movement. The dispensing station receives and carries the reaction vessel transferred from the transferring unit, and allows the dispensing unit to dispense the reaction vessel with the sample and the reagent. The dispensing station is provided with a reaction vessel position for placing a reaction vessel that requires to be dispensed with the sample and reagent. In order to mix the sample and reagent more uniformly and react more completely, and in order to simplify the whole structure and reduce the volume, a mixing mechanism can be integrated into the dispensing station, so as to perform ultrasonically well mixing, bias rotation or oscillatory well mixing to the reaction vessel after each dispensing. Alternatively, the mixing mechanism, such as an ultrasonic generator, can be integrated into the dispensing unit, and the well mix can be implemented by the ultrasonic waves generated by the dispensing unit while the sample and the reagent are being dispensed or after the dispensing operation is completed. It will be understood by those skilled in the art that the dispensing station may not be integrated with the mixing mechanism, and the well mixing may be completed by the suction and discharge action or the impact force of the dispensing unit. In order to make the whole apparatus more compact, the dispensing station can also be integrated into the reaction unit, in that case the dispensing station may not require to be located within the track of the transferring unit.

The reaction unit incubates the reactants in the reaction vessel and transfers the reaction vessel. The reaction unit mainly includes a heat preservation device and a rotation device. A periphery of the heat preservation device is usually provided with thermal insulation material, such as heat preservation cotton, which usually wraps or surrounds the bottom, the periphery, and the upper portion of the rotating device. A heating device and a sensor may be disposed on the inner side or the bottom of the heat preservation device. A cover plate is located at the upper portion to provide a constant temperature incubation environment for the reaction unit and prevent or reduce the heat loss of the reaction unit. Of course, in order to increase the heat transferring efficiency, the heating device can also be mounted on the rotating device. In addition to provide the incubation environment, the heat preservation apparatus can also support and fix a magnetic field generating device of the B/F unit to provide a magnetic field environment for washing. In addition, if the detecting unit is mounted on the reaction unit, the heat preservation apparatus can not only provide a mounting position for a photometry unit, but also can implement a darkroom environment required by the photometry unit. The number of the rotating apparatus is preferably one, which includes a driving mechanism, a transmission mechanism, and an associated control circuit, etc. The rotation device is controlled and driven to rotate at a fixed angle every fixed time (such as a cycle or a period), so as to transfer the reaction vessel to move forward a certain position (such as move forward to a reaction vessel position). The rotating device is provided with a plurality of holes, slots, brackets, bases or other structures suitable for holding the reaction vessel, which are defined as the reaction vessel positions. In addition to hold the reaction vessel, the reaction vessel position can also fix the reaction vessel. The wording "fix" herein means that the reaction vessel does not move or slide in the reaction vessel position, but can be carried forward along with the reaction vessel position together. In this way, the reaction vessel and the reaction vessel position can be firmly attached, and the gap therebetween is smaller, which not only facilitates heat transfer incubation and precise positioning of the reaction vessel, but also simplifies the structure of the rotating apparatus, accommodates more reaction vessel positions, and reduces manufacturing cost, thereby effectively solving some shortcomings and defects such as poor heat transfer efficiency, space waste, and complicated structure caused by the movement of the reaction vessel in the reaction vessel position in the prior art. In addition to the bearing and fixing, the reaction unit can also incubate the reactants in the reaction vessel. For the test that requires signal incubation, the reaction unit of the present disclosure can also implement a signal incubation function.

According to different focuses and necessities of the main function implemented by the reaction vessel position, the reaction vessel positions can be divided into two kinds or two types: a first reaction vessel position and a second reaction vessel position. The first reaction vessel position is defined as a reaction vessel position on the rotating apparatus of the reaction unit and can carry the reaction vessel forward to the B/F unit to wash or/and transfer the reaction vessel to the detecting unit to detect. The first reaction vessel position mainly accommodates the reaction vessel to be or being washed and detected. The second reaction vessel position is defined as a reaction vessel position on the rotating apparatus of the reaction unit other than the first reaction vessel position. The second reaction vessel position is a main place for the reaction and incubation of the reactants in the reaction vessel, such that the sample analytes and the corresponding reagents, the reagents and the reagents react with each other in the reaction vessel. As long as the reactants in the reaction vessel requires to be incubated, regardless of being incubated once, twice or more times, the incubation can be completed in the second reaction vessel position or can be performed for a certain period of time. As a preferred embodiment, the incubation in the second reaction vessel position includes the incubations of the reactants in the reaction vessel which requires to be incubated once, twice or more, such that the reaction vessel can intensively perform the incubation, and the space of the reaction unit can be fully utilized. In general, the more the number of the second reaction vessel position, the longer incubation time that can be supported, and the higher the test throughput. If the reaction vessel in the second reaction vessel position is to be washed after the incubation is completed or performed after a certain period of time, the reaction vessel is transferred to the first reaction vessel position by the transferring unit. It should be noted that, although the main function of the first reaction vessel position is to carry the reaction vessel thereon forward to the B/F device for washing or/and to the detecting unit for detecting under the rotation of the rotating device, the incubation can be implemented during the process of carrying the reaction vessel forward to the B/F unit, and all or part of the signal incubation can be implemented after carrying the reaction vessel away from the B/F unit. Of course, when the number of the first reaction vessel position is limited, the incubation and signal incubation functions may not be implemented. For all or part of the signal incubation, taking the signal incubation of chemiluminescence enzyme immunoassay as an example, if the signal incubation thereof takes 6 minutes, the first reaction vessel position can implement the full 6 minutes signal incubation or only 3 minutes signal incubation, the rest of the signal incubation can be completed in the detecting unit. Of course, it is possible not to implement the signal incubation, and the signal incubation function is completely finished by the detecting unit. The configuration of the first and second reaction vessel positions not only avoids the transferring of the reaction vessel between the first reaction vessel positions, but also effectively reduces the size of the reaction unit and simplifies the control flows and actions. Moreover, at the same time the layout of the whole apparatus is facilitated, the space utilization of the reaction unit is maximized, such that the structure of the whole apparatus is more compact and the cost is lower.

The B/F unit washes the reaction vessel in the first reaction vessel position to separate the unbound components from the reactants. Immunoassay technology can be divided into homogeneous reaction (without separating) and heterogeneous reaction (requiring separating) according to whether the unbound components (mostly the markers) in the reaction process require to be washed. Most immunoassay techniques use the heterogeneous reaction pattern. The immunoreaction is carried out in two steps. At the same time as obtaining the immune complex containing the labelled antigen or antibody, the unbound components (mainly the free labelled antigen or antibody) in the reactant are separated by different separating means, and then the luminescent reaction is completed on the basis of the immune complex containing the marker. In order to implement the separating of free marker and immune complex marker, the method used in each system is different, mainly using solid phase (plate-type chemiluminescence), filtering-separating (filtration membrane separating), bead-type (directly in millimeters, usually plastic bead, glass bead and the like) separating, paramagnetic particles (with a diameter typically in a range of a few nanometers to tens of micrometers, also known as magnetic particles, magnetic beads, etc.) separating. Due to the large surface area of the paramagnetic particle, the paramagnetic particle has become the preferred separating method for heterogeneous luminescence immunoassay technology.

The apparatus provided by the present disclosure supports various separating modes for the heterogeneous immunoreactions. The working principle of the B/F unit of the apparatus of the disclosure will be briefly described below by taking the washing of the paramagnetic particle as an example. The B/F unit of the disclosure includes a magnetic field generating device and a flushing mechanism. The magnetic field generating device provides a magnetic field environment for collecting the paramagnetic particle in the reaction vessel to the inner wall of the reaction vessel. Due to factors such as a response time, a moving distance and a resistance in the magnetic field, it takes a certain time for the paramagnetic particles to be collected to the inner wall of the reaction vessel, usually ranged from a few seconds to tens of seconds, so that before draining the waste liquid (including the unbound component) each time, the reaction vessel on the first reaction vessel position is required to pass through the magnetic field for a period of time. In a preferred embodiment of the invention, the magnetic field generating apparatus can be directly mounted on or fixed to the heat preservation apparatus of the reaction unit, which not only saves additional fixing mechanism and reduces cost, but also brings the magnet generating apparatus closer to the second reaction vessel position of the reaction unit, so as to reduce the collecting time of the paramagnetic particles and improve the efficiency of the washing. The flushing mechanism includes a liquid drawing and injecting device to implement the drawing of the unbound component and the injection of the washing buffer liquid. The liquid-drawing device includes a liquid drawing part suitable for drawing the liquid, such as a liquid drawing needle, a liquid drawing tube or a liquid drawing nozzle. The liquid drawing part is arranged above the first reaction vessel position of the reaction unit, and can move in and out of the reaction vessel in the first reaction vessel position driven by a driving mechanism to draw the unbound components in the reaction vessel. The liquid injecting apparatus includes a liquid injecting part arranged also above the first reaction vessel position of the reaction unit. The liquid injecting part can inject the washing buffer into the drawn reaction vessel. Each flushing includes one drawing and one injection of washing buffer liquid process, usually flushing three or four times, i.e., three or four flushing is performed, of course, the number of the flushing can be variable. In order to make the washing more thorough and reduce the residues, it is also possible to employ a mixer at the liquid injecting position to mix the reaction vessel. Alternatively, the paramagnetic particles are resuspended and evenly dispersed in the washing buffer liquid by using an impact force when or after the washing buffer liquid is injected. When the rotating apparatus of the reaction unit carries the reaction vessel forward to the B/F unit, the B/F unit starts to wash the reaction vessel in the first reaction vessel position. In addition, in order to simplify the mechanism, the B/F unit may further include a signal reagent dispensing mechanism. After the washing of the reaction vessel in the first reaction vessel position of the reaction unit is completed, and all or part of the signal reagents are dispensed thereto, e.g., all of the first and second signal reagents are dispensed or only the first signal reagent is dispensed, etc., and the remaining signal reagents can be dispensed during the detection. Thus, the function of the washing mechanism can be fully exploited, the size of the mechanism is reduced and the cost is saved.

It can be concluded from the above description that, since the B/F unit is disposed on the periphery of the reaction unit or on the reaction unit, the reaction vessel on the first reaction vessel position of the reaction unit can be directly washed, thereby avoiding an independent B/F unit, such as an independent B/F carousel or B/F rail, etc., which not only simplify the components and the whole mechanism to make the whole mechanism more compact and lower in cost, but also avoid the transferring of the reaction vessel between the independent B/F unit and the reaction unit, such that the control flow of the whole apparatus is simpler and more efficient, thereby improving processing efficiency and reliability.

The detecting unit can detect the signal in the reaction vessel. The signal can be an electrical signal, a fluorescent signal or a weak chemiluminescence signal generated after dispensing the signal reagent to the reaction vessel. The detecting unit includes photodetector photomultiplier tube (PMT) detecting weak light or other sensitive optoelectronic induction device that converts the detected optical signal into an electrical and transmit it to the control center. In addition, in order to improve the detection efficiency and ensure the detection uniformity, the detecting unit may further include optical device, such as optical signal collection and calibration device and so on. In a preferred embodiment of the invention, the detecting unit can be connected or mounted to the reaction unit via a common manner, such as directly mounted and fixed on the reaction unit or connected and mounted to the reaction unit via an optical fiber, so as to detect the signal in the first reaction vessel on the first reaction vessel position, which can omit an independent detecting unit, thereby eliminating the transfer of the reaction vessel between the reaction unit and the detecting unit, such that the whole mechanism is more compact, the cost is lower, the control flow is simpler and more efficient, the processing efficiency and reliability are higher. Of course, according to the requirement of the actual design, in another embodiment of the present disclosure, the detecting unit may be independently provided. The detecting unit includes a detecting position independent from the reaction unit. The transferring unit transfers the reaction vessel to be detected from the second reaction vessel position of the reaction unit to the detecting position of the detecting unit to perform the detection. In this embodiment, the arrangement of the detecting unit is more flexible without depending on the reaction unit, and is convenient to design a light-proof mechanism for the detecting unit, which is beneficial to the layout of the whole apparatus and the design of the modular mechanism.

Further, in order to deliver the sample, the stored reagent, and the signal reagent, the automatic analysis apparatus of the present invention may further be provided with a sample delivery unit, a reagent storage unit, and a signal reagent storage unit.

The sample delivery unit is used to place the sample tube to be tested and deliver the target sample tube to a sample drawing position. The sample delivery unit has three main modes: orbital presentation, sample tray presentation, and fixed area presentation. The sample tube is usually placed on the sample rack. 5 or 10 sample tubes are placed on each sample rack, and the sample rack is placed on the transfer rail, a sample tray or a fixed area of the analysis apparatus.

The reagent storage unit refrigerates the reagent and transfers the target reagent to the reagent drawing position. The reagent storage unit usually adopts two methods of the reagent tray and the fixed reagent storage area. In order to ensure the stability of the reagent, the reagent tray generally has a cooling function, such as 4° C. to 10° C. A plurality of reagent pack positions are generally disposed on the reagent tray for placing the reagent vessel. Each reagent pack is provided with a plurality of independent chambers for storing different reagent components, such as magnetic particle reagents, enzyme-labelled reagents, diluents, and the like.

The signal reagent storage unit stores the signal reagent. The reaction vessel, which requires to be detected after washing, is injected with the signal reagent to generate a signal. For an acridine ester-labelled flash system, the signal reagent includes a pre-trigger liquid, a trigger liquid, etc. For an enzyme-labelled luminescence enzyme system, the signal reagent includes a helical adamantane substrate, a luminol and a derivative substrate thereof, etc. For the fluorescent system, the signal reagent may be 4-methyl umbrella ketone, etc. The mechanism for dispensing the signal reagent can be coupled to the B/F unit, so that the mechanism can be simplified. The mechanism for dispensing can be implemented by an individual mechanism, which can make the dispensing action more flexible. When there is more than one signal reagent, the mechanism for dispensing the signal reagent can be more than one. Some luminescent systems, such as acridine ester-labelled flash system, require an immediate detection during dispensing the signal reagent or after all signal reagents are dispensed, without the signal incubation. Some luminescent systems, such as luminescence enzyme system, require to incubate the signal for a period of time after dispensing the signal reagent and then perform the detection.

Figure 4:
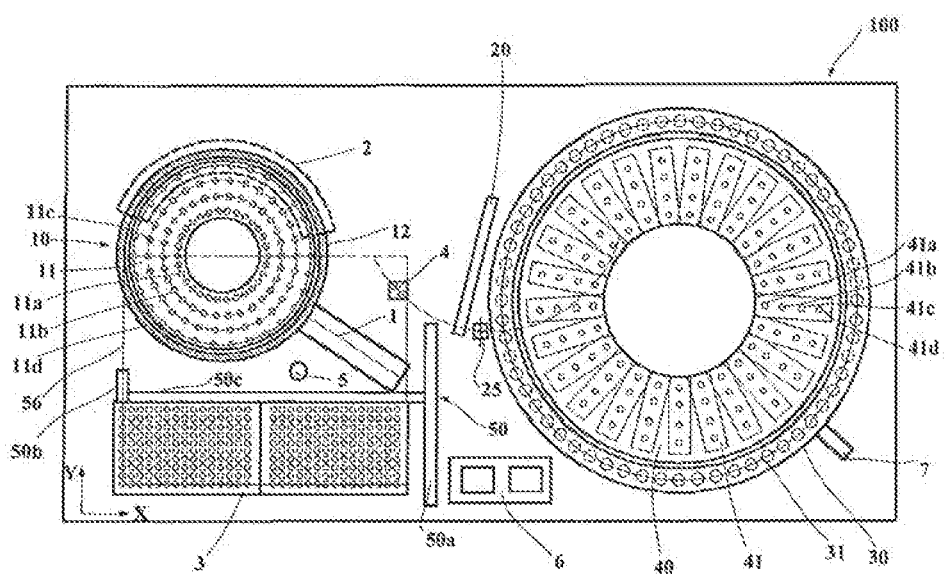
FIG. 4 is a schematic diagram of an automatic analysis apparatus according to a first embodiment of the present invention.

A first embodiment of the automatic analysis apparatus of the disclosure is provided, as shown in FIG. 4. The automatic analysis apparatus 100 includes a sample delivery unit 30, a reagent storage unit 40, a barcode identification unit 7, a dispensing unit 20, a dispensing station 4, a reaction vessel supplying unit 3, a transferring unit 50, a reaction unit 10, a B/F unit 2, and a signal storage unit 6, and a detecting unit 1, etc. The function and effect of each part will be described below.

The sample delivery unit 30 is used to place the sample tube 31 to be detected and deliver the target sample tube to the sample-drawing position. In this embodiment, the sample delivery unit 30 is a sample tray on which an arc sample rack (not shown) is placed, and ten sample tubes 31 are placed on each arc sample rack. The sample tray can be driven by the driving mechanism to transfer the target sample to the sample drawing position under the control of the control center, and the sample drawing position is located at an intersection of the horizontal movement track of the dispensing unit 20 and a center circle of the sample tube.

The reagent storage unit 40 refrigerates the reagent vessel 41 and transfers the target reagent to the reagent drawing position. In the embodiment, the reagent storage unit 40 is a reagent tray which is provided with twenty-five reagent positions for receiving twenty five reagent packs 41 (or kits, reagent bottles, hereinafter referred to as reagent bottles for convenience). In this embodiment, each of the reagent bottles 41 is provided with four chambers 41a, 41b, 41c, and 41d configured to store the reagent components such as magnetic particle reagents, enzyme labelled reagents, and diluents, etc. The reagent tray can be driven by the driving mechanism to transfer the target reagent bottle to the reagent drawing position under the control of the control center. The reagent drawing position is located at the intersection of the horizontal movement track of the dispensing unit and the center circle of the reagent chamber. In the embodiment, corresponding to the 4 reagent components, there are 4 reagent drawing positions (not shown).

In order to identify the sample rack, the sample tube, and the reagent bottle, the automatic analysis apparatus 100 is also provided with a barcode scanning unit 7 configured to scan and identify the barcode information on the sample rack, the sample tube and the reagent bottle. The barcode scanning unit can be fixed-type, hand-held-type or the like, and may also be multiple. In the embodiment, in order to make the structure of the whole apparatus more compact and reduce the cost, the barcode scanning unit 7 is fixed-type and can simultaneously scan the sample information on the sample tray and the reagent information on the reagent tray.

The dispensing unit 20 completes the dispensing of the sample and the reagent. The horizontal movement track of the dispensing unit intersects with the dispensing station 4, the sample tray 30, and the reagent tray 40, and the intersection points are the dispensing position, the sample drawing position, and the reagent drawing position, respectively. In the embodiment, the dispensing unit is a single sample dispensing mechanism, which can move up and down and rotate horizontally, and can dispense both the sample and the reagent, so that the structure of the whole apparatus is more compact and the cost is lower.

In the embodiment, the dispensing station 4 is located under the horizontal movement track of the transferring unit 50 and the dispensing unit 20. The dispensing station 4 receives and carries the reaction vessel transferred by the transferring unit 50, and allows the dispensing unit 20 to dispense the sample and reagent into the reaction vessel. A reaction vessel position is disposed on the dispensing station for placing a reaction vessel required to be dispensed with the sample and reagent. In this embodiment, the mixing mechanism is integrated in the dispensing station, to perform the ultrasonic mixing, biased rotation or oscillatory mixing on the reaction vessel after each dispensing, so that the technology is less difficult to implement and the structure is more compact.

The reaction vessel supply unit 3 stores and provides the reaction vessel. In the embodiment, in order to make the whole apparatus more impact and lower in cost, the reaction vessel supply unit is a prearranged type. The reaction vessel supply unit 3 includes two reaction vessel trays on which a plurality of reaction vessel positions are provided to store unused reaction vessels. The reaction vessel supply unit 3 is within the range of the horizontal movement of the transferring unit 50, thus the transferring unit 50 can traverse the unused reaction vessel in each reaction vessel position on the tray, and provide the unused reaction vessel for a new test.

The transferring unit 50 transfers the reaction vessels between different positions of the automatic analysis apparatus 100. In the embodiment, the transferring unit 50 is configured as one, and can perform the three-dimensional movement, which makes the whole apparatus more compact and lower in cost. The transferring unit 50 includes an X-direction movement manipulator 50*b*, a Y-direction guide rail 50*a*, a Y-direction movement mechanical arm 50*c*, and a vertical movement mechanism and mechanical fingers (not shown). The movement track of the transferring unit 50 covers a range in a boundary rectangle 56, and the reaction vessel can be transferred among the reaction vessel supply unit 3, the dispensing station 4, the first reaction vessel position on the reaction unit 10, the second reaction vessel position on the reaction unit 10, and a reaction vessel discarding chute 5. In addition, since the movement track of the transferring unit 50 covers a plurality of the first reaction vessel positions on the reaction unit 10, the transferring unit can implement flexible incubation time by placing the reaction vessels into different first reaction vessel positions or transferring the reaction vessels from the different first reaction vessel positions.

The reaction unit 10 incubates and transfers the reaction vessel. In the embodiment, the heat preservation device of the reaction unit 10 is a pot body 12 and an upper cover (not shown), and the rotating apparatus is a reaction tray 11. A heater and a sensor are provided on the side or on the inner side of the bottom of the pot body 12, surrounding the bottom and the periphery of the reaction tray 11, which can provide a constant temperature incubation environment for the reaction unit 10 and prevent or reduce the loss of heat of the reaction unit 10. In addition to provide an incubation environment, the pot body 12 also supports and fixes the magnetic field generating apparatus of the bound-free apparatus 16 and provides a magnetic field environment for the washing. The reaction tray 11 is rotatable about a central axis, and four circles of reaction vessel positions which are centered on the center of rotation are disposed thereon. Of course, the number of the circles can be changed, for example, two circles, three circles, five circles or more. The first reaction vessel positions are distributed on the outer circle 11*d*, and the second reaction vessel positions are distributed on the inner three circles 11*a*. 11*b*, 11*c*. The first reaction vessel position transfers the reaction vessel to the B/F unit 2 and the detecting unit 1. When passing through the B/F unit 2, the reaction vessel on the first reaction vessel position is washed by the B/F unit 2, when passing through the detecting unit, the reaction signal inside the reaction vessel on the first reaction vessel position is detected by the detecting unit.

The B/F unit 2 is configured to wash the reaction vessel on the first reaction vessel position to separate the unbound component in the reactant. In the embodiment, the automatic analysis apparatus 100 employs a paramagnetic particle bound-free method. The magnet generating apparatus of the B/F unit 2 is a permanent magnet apparatus, which can provide a stronger and more stable magnetic field environment. The flushing mechanism of the B/F unit 2 includes the liquid drawing apparatus and the liquid injecting apparatus, and the mixing mechanism. When the reaction unit 10 transfers the reaction vessel to the B/F unit 2, it begins to undergo a washing process.

The signal reagent storage unit 6 stores a signal reagent. In the embodiment, the signal reagent storage unit 6 stores two bottles of identical signal reagent, which is convenient for the user to replace. Of course, it is also possible to place a suitable number of signal reagents.

The detecting unit 1 detects the signal in the reaction vessel on the first reaction vessel position. In the embodiment, the detecting unit 1 is directly mounted in the reaction unit, to detect the weak chemiluminescence signal generated after dispensing the signal reagent into the reaction vessel. The detecting unit 1 includes a weak light photodetector photomultiplier tube (PMT) or other sensitive photoelectric induction device which can convert the detected optical signal into an electrical signal and transmit it to the control center.

Figure 5:
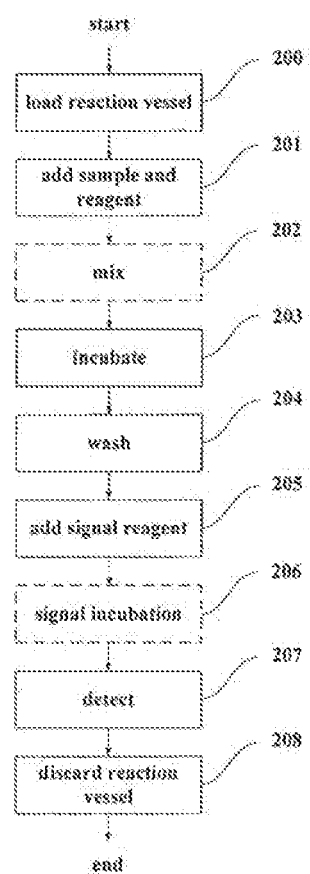
FIG. 5 is a test flow chart of a one-step protocol.

A one-step protocol test is taken as an example, the testing flow and steps of the automatic analysis apparatus 100 will be briefly described with reference to FIGS. 4 and 5. After the test starts, the flow goes as follows.

Step 200: loading a reaction vessel: the transferring unit 50 transfers an unused reaction vessel from the reaction vessel supply unit 3 to the reaction vessel position of the dispensing station 4.

Step 201: dispensing the sample and the reagent: the dispensing unit 20 draws the sample and the reagent from the sample drawing position and the reagent drawing position, respectively and dispenses the drawn sample and reagent into the reaction vessel on the dispensing station 4.

Step 202: mixing: if mixing is required, the mixing mechanism integrated in the dispensing station 4 mixes the sample and reagent in the reaction vessel; if no mixing is required, this step is omitted.

Step 203: incubation: the transferring unit 50 transfers the reaction vessel dispensed with the sample and the reagent from the dispensing station to the second reaction vessel position of one of the inner three circles (11*a*, 11*b*, 11*c*) in the reaction tray 11, and the reaction vessel starts the incubation in the reaction unit. While the reaction vessel is incubated, it is advanced by one position as the reaction tray 11 rotates at regular intervals. The incubation time varies depending on the specific assay, which is usually 5 to 60 minutes.

Step 204: washing: after the incubation is completed or the incubation is performed after a certain period of time, the transferring unit 50 transfers the reaction vessel from the second reaction vessel position of the reaction tray 11 to the first reaction vessel position of the outer circle 11d. The reaction tray 11 is rotated and advanced by one position at regular intervals, such that the reaction vessel on the first reaction vessel position is carried forward to the B/F unit 2. When passing through the magnetic field of the B/F unit 2, the flushing mechanism of the B/F unit 2 and the mixing mechanism complete the drawing liquid, injecting the washing buffer liquid, washing and mixing for the reaction vessel until the washing is completed.

Step 205: dispensing a signal reagent: after the washing is completed, the reaction tray 11 continues to carry the reaction vessel on the first reaction vessel position away from the magnetic field region, and the signal reagent injection mechanism injects a signal reagent into the reaction vessel.

Step 206: signal incubation: if the signal incubation is required, the reaction vessel is carried forward by one position at regular intervals with the reaction tray 11 rotation while the reaction vessel on the first reaction vessel position performs the signal incubation; if no signal incubation is required, this step can be omitted.

Step 207: detecting: when the reaction vessel on the first reaction vessel position is carried forward to the detecting unit 1, the reaction signal in the reaction vessel is detected by the detecting unit 1, and the detecting result is processed and transmitted to the control center of the automatic analysis apparatus.

Step 208: discarding the reaction vessel: the transferring unit 50 transfers the detected reaction vessel from the first reaction vessel position to the discarding chute 5 to discard.

Figure 6:
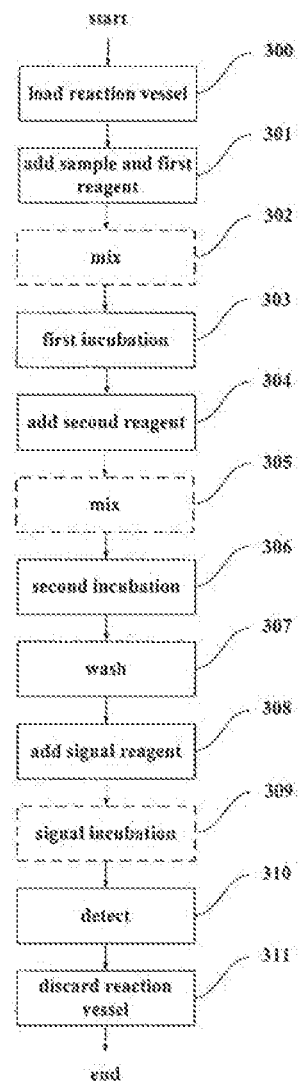
FIG. 6 is a test flow chart of a one-step delay protocol.

Referring to FIGS. 4 and 6, the test procedure and steps of the one-step delay protocol differ from the one-step protocol test in steps 301 to 305, in which the reagent is injected in two batches and another incubation is added, and the other steps are similar to the one-step protocol, which will no longer be repeated here.

Step 301: dispensing the sample and the first reagent: the dispensing unit 20 draws the sample and the first reagent from the sample drawing position and the reagent drawing position, respectively and dispenses the drawn sample and first reagent into the reaction vessel on the dispensing station, Step 302: mixing: if the mixing is required, the mixer integrated in the dispensing station 4 mixes the sample and the first reagent in the reaction vessel. If no mixing is required, this step is omitted.

Step 303: incubation: the transferring unit 50 transfers the reaction vessel dispensed with the sample and the first reagent from the dispensing station 4 to the second reaction vessel position in the inner three circles (11a, 11b, 11c) in the reaction tray 11, and the reaction vessel starts the incubation in the reaction unit for the first time. While the reaction vessel was incubated for the first time, it is carried forward by one position with the reaction tray 11 at regular intervals. The first incubation time varies depending on the specific assay, which is usually 5-60 minutes.

Step 304: dispensing a second reagent: after the first incubation is completed, the transferring unit 50 transfers the reaction vessel from the second reaction vessel position of the reaction unit 10 to the dispensing station 4, and the dispensing unit 20 draws the second reagent from the reagent drawing position and dispenses the drawn second reagent into the reaction vessel on the dispensing station 4.

Step 305: mixing: if the mixing is required, the mixer integrated in the dispensing station 4 mixes the reactants in the reaction vessel. If no mixing is required, this step is omitted.

Figure 7:
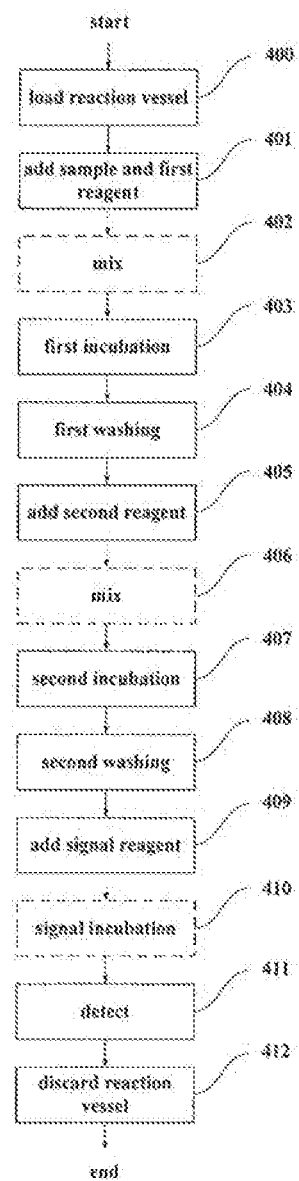
FIG. 7 is a test flow chart of a two-step protocol.

Referring to FIGS. 4 and 7, the test flow and steps of the two-step protocol differ from the one-step delay protocol in dispensing step 404, i.e., another one washing is added.

Step 404: washing: after the incubation is completed or the incubation is performed after a certain period of time, the transferring unit 50 transfers the reaction vessel from the second reaction vessel position of the reaction tray 11 to the first reaction vessel position, and the reaction tray 11 is rotated and advanced by one position at regular intervals to carry the reaction vessel forward on the first reaction vessel position to the B/F unit 2. When passing through the magnetic field of the B/F unit 2, the flushing mechanism of the B/F unit 2 and the mixing mechanism complete the drawing liquid, injecting the washing buffer liquid, washing and mixing for the reaction vessel until the first washing is completed. After the first washing is completed, the transferring unit 50 transfers the reaction vessel from the first reaction vessel position of the reaction tray 11 to the dispensing station 4.

The other steps of the two-step protocol are similar to the one-step delay protocol, and details are no longer repeated here.

As can be seen from the above description, the automatic analysis apparatus 100 not only eliminating the bound-free tray and/or the detecting tray used in the prior art, reduces the size of the whole apparatus and the cost, but also simplifies the test steps and reduces the control complexity and difficulty, avoiding the transfer of the reaction vessel between multiple trays. In addition, the reaction unit is provided with different reaction vessel positions, and the B/F unit and the detecting unit are arranged on or around the reaction unit, and the incubation is mainly performed on the first reaction vessel position, and the bound-free and detection are implemented on the second reaction vessel position, the size of the reaction unit is further reduced, so that the structure of the whole apparatus is more compact, the cost is lower, and the test efficiency is higher. In addition, the movement track of the transferring unit covers a plurality of first reaction vessel positions, and a flexible incubation time can also be implemented.

Figure 8:
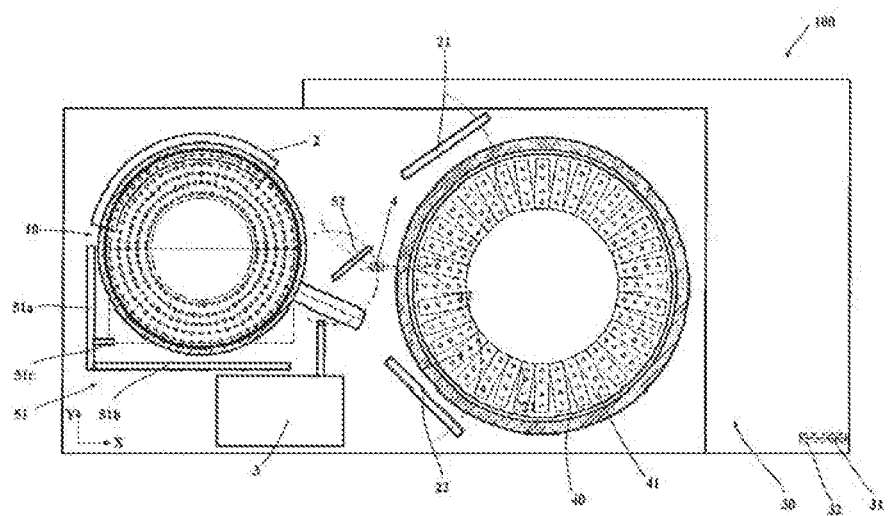
FIG. 8 is a schematic diagram of an automatic analysis apparatus according to a second embodiment of the present invention.

In addition to the special advantages mentioned above, the automatic analysis apparatus of the disclosure can be flexibly expanded to implement serialization of products. On the basis of the first embodiment, in order to further improve the specifications and test throughput of the whole apparatus and meet the requirements of the terminal customers with a larger sample amount, the number of the transferring unit and the dispensing unit can be increased, the size of the reaction unit size can be appropriately increased, or the number of the reaction unit can be increased. FIG. 8 is a schematic diagram of a second embodiment of an automatic analysis apparatus of the invention. The sample delivery unit 30 adopts the presentation mode of the rail and the sample rack, so that more samples can be accommodated, the sample can be added in real time, and the operation is more convenient. The sample rack 32 and the sample tube 31 thereon can be delivered to the movement track of the first dispensing unit 21. The reagent storage unit 40 increases the reagent storage position to place more reagent packs. The dispensing unit 20 includes a first dispensing unit 21 and a second dispensing unit 22. The first dispensing unit 21 only dispenses the sample or the sample and a part of the reagent and the second dispensing unit 22 dispenses the reagent. Of course, more dispensing units may be dispensed, so as to increase the speed of dispensing the sample and reagent. The reaction vessel supply unit 3 adopts a silo type, and the reaction vessels in packs can be poured into the silo of the reaction vessel supply unit 3 in a random manner, which increases the supply of the reaction vessel, and makes it faster, and more convenient. The transferring unit 50 includes a first transferring unit 51 and a second transferring unit 52. The first reaction vessel unit 51 transfers the reaction vessel mainly among the first reaction vessel position and the second reaction vessel position of the reaction unit 10, and the reaction vessel discarding chute. The second transferring unit 52 transfers the reaction vessel mainly among the reaction vessel supply unit 3, the dispensing station 4, and the reaction unit 10. Those skilled in the art will be understood that through reasonable placement and distribution, the transfer of the reaction vessel between any two positions can be completed by the first or second transferring unit or simultaneously completed by both. Of course, there may be more than two transferring units, and more transferring units may be disposed as required to increase the efficiency and speed of transfer of the reaction vessel. The reaction unit 10 is arranged with more reaction vessel positions, can accommodate more reaction vessels, thereby increasing the number of continuous incubation and the transferred reaction vessels, and increasing the test throughput.

The test flow and steps of this embodiment differs from the first embodiment in that the dispensing of the sample and reagent are completed by the cooperation of the first and second dispensing units, and the transfer of the reaction vessel is completed by the cooperation of the first and second transferring units, and other actions and flow are the same as or similar to those of the first embodiment. Referring to FIG. 5 to FIG. 7, the details are no longer repeated here. Compared to the prior art, this embodiment avoids the additional large-sized bound-free tray and detecting tray and the complicated reaction vessel transfer control process, and also reduces the size of the reaction unit itself through partitioning or sorting the reaction vessel positions with different functions, thereby making the whole apparatus more compact, lower in cost, more efficient and more reliable.

Figure 9:
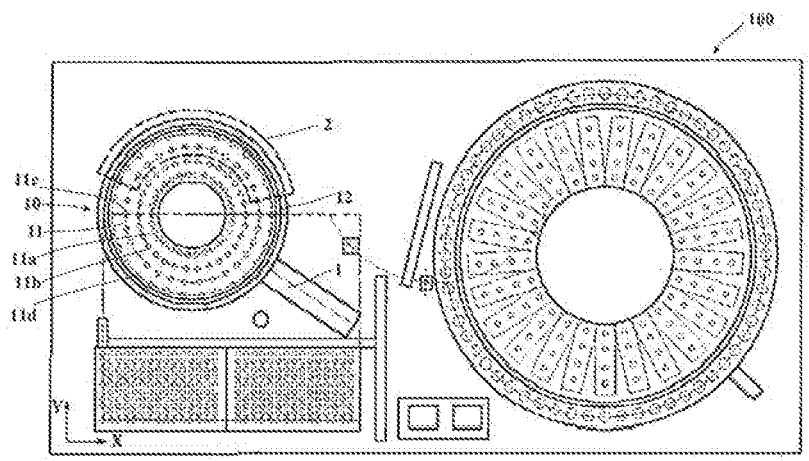
FIG. 9 is a schematic diagram of an automatic analysis apparatus according to a third embodiment of the present invention.

Since the two-step protocol requires two washing, in order to improve the test efficiency of the two-step protocol or the washing, the present disclosure can also be implemented by adjusting the function division of the reaction unit 10. Referring to FIG. 9, which is a schematic diagram of a third embodiment of an automatic analysis apparatus of the disclosure. The main difference between the third embodiment and the first embodiment is that the first reaction vessel position zone of the reaction unit 10 is 11c, 11d, and the second reaction vessel position zone is 11a, 11b. The magnetic field generating apparatus of the B/F unit 2 may be disposed on the pot body below a position between the first reaction vessel position zones 11c, 11d or other suitable positions, and the washing of the reaction vessel on 11c, 11d may be implemented by increasing the number of the liquid injecting part and the liquid drawing part of the B/F unit 2. In this embodiment, the B/F unit 2 can simultaneously wash the first reaction vessel position on the first reaction vessel position zone 11c, 11d, thereby improving the efficiency of washing, and solving the low efficiency of washing in the prior art or the problem of slow speed test of the two-step protocol, also avoiding the disadvantages of large volume and high cost caused by the requirement of two or more B/F units in the prior art. Those skilled in the art should be understood that the reaction unit 10 can be provided with more cycles or fewer cycles of the reaction vessel position, and the reaction vessel positions included in the first reaction vessel position zone and the second reaction vessel position zone can be flexibly and arbitrarily combined, without limitation to the solution of this embodiment.

Figure 10:
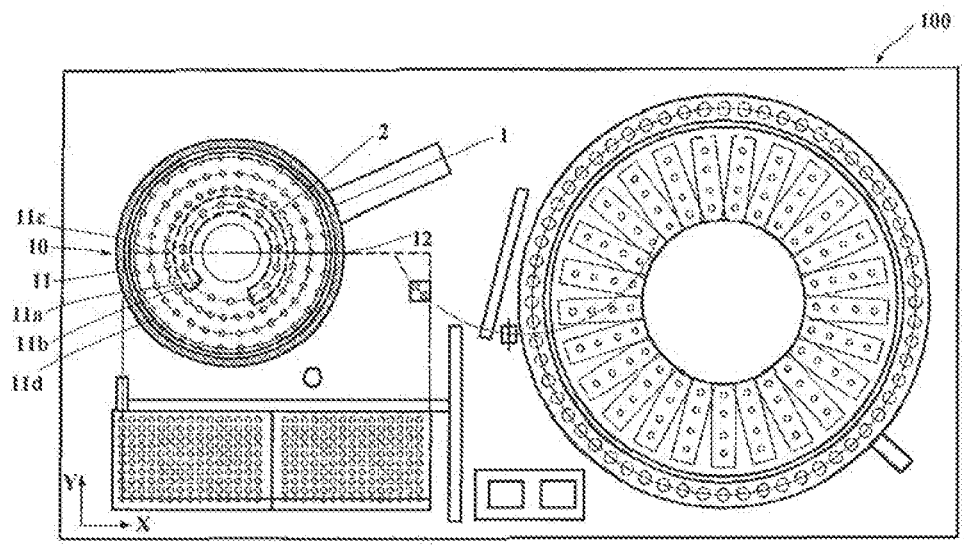
FIG. 10 is a schematic diagram of an automatic analysis apparatus according to a fourth embodiment of the present invention.

In order to make the B/F unit mechanism more compact, while minimize the influence of the B/F unit on the detecting unit, such as temperature fluctuation caused by the washing process, the function division of the reaction unit 10 is simply adjusted. FIG. 10 is a schematic diagram of a fourth embodiment of an automatic analysis apparatus of the present invention. The main difference between the fourth embodiment and the first embodiment is that the first reaction vessel position zone of the reaction unit 10 is the inner circle 11a and the outer circle 11d, and the reaction vessel position zone is the middle two circles 11b, 11c. The reaction vessel position on the first reaction vessel position zone 11a is mainly configured to wash, and the reaction vessel position on the first reaction vessel position zone 11d is mainly configured to detect. The magnetic field generating apparatus of the B/F unit 2 may be disposed on the pot body below the inner side of the first reaction vessel position zone 11a or at other suitable position, and the liquid injecting part and the liquid drawing part of the B/F unit 2 may wash the reaction vessel on the 11a. After the reaction vessel in the reaction vessel position on the first reaction vessel position zone 11a is washed, if the detecting is required, it is transferred by the transferring unit 50 to the reaction vessel position on the first reaction vessel position zone 11d, and is transferred by the reaction vessel position on the first reaction vessel position zone 11d to the detecting unit 1 to complete the detection. If the reaction vessel requires signal incubation prior to the detection, the reaction vessel can implement the signal incubation during the process of the transfer. The test flow and the steps of this embodiment are mainly different from the first embodiment in that the reaction vessel required to be detected after the washing is transferred to the reaction vessel position on the first reaction vessel position zone 11d by the transferring unit 50 to continue to complete the transfer and detection. Other operation and process are the same as or similar to those of the first embodiment, and will not be repeated again with reference to FIGS. 5 to 7. In this embodiment, the B/F unit 2 is arranged on the inner side of the reaction unit the detecting unit is arranged on an outer side of the reaction unit, thus the structure of the B/F unit can be more compact, and the influence on reaction incubation and signal incubation due to the temperature fluctuation caused by the bound-free process can be reduced.

Figure 11:
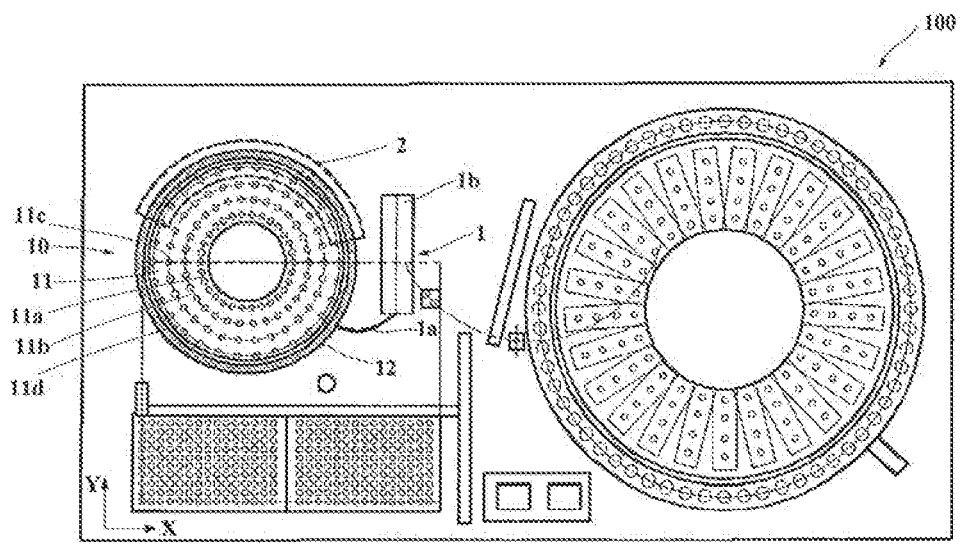
FIG. 11 is a schematic diagram of an automatic analysis apparatus according to a fifth embodiment of the present invention.
Figure 12:
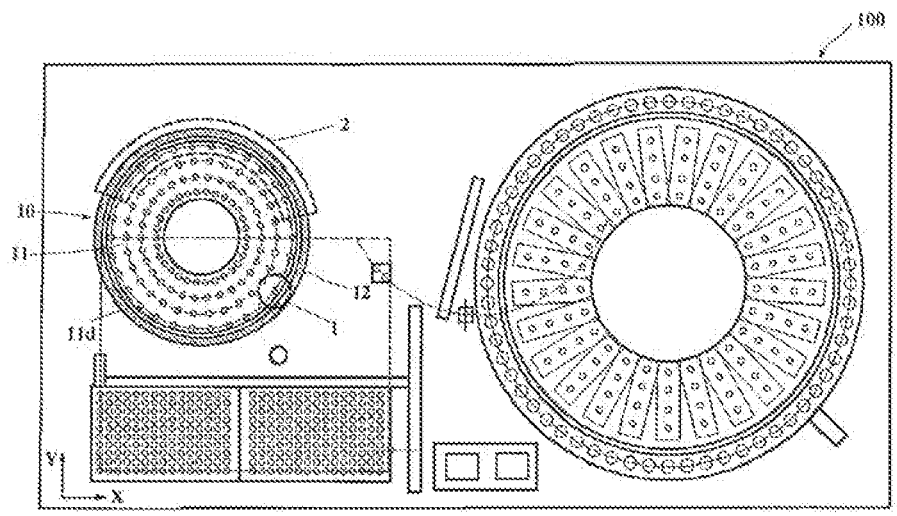
FIG. 12 is a schematic diagram of an automatic analysis apparatus according to a sixth embodiment of the present invention.

Depending on the difference of the structure, layout of the whole apparatus, or the specific component structure, and the factors of production and assembly processes and so on, the arrangement and installation of the detecting unit in the apparatus of the disclosure can also be flexibly arranged in various ways. FIGS. 11 and 12 are schematic diagrams of a fifth and sixth embodiment of the automatic analysis apparatus of the present invention. In the fifth embodiment, the detecting unit includes a detecting body 1b and a connection portion 1a. The connection portion 1a may be a signal transmitting apparatus such as an optical fiber, one end of which is connected or mounted to the reaction unit 10, and the other end is connected or mounted to the detecting body 1b. In this way, the position of the detecting unit 1 in the automatic analysis apparatus 100 can be flexibly adjusted and arranged without being limited by the reaction unit 10. In the sixth embodiment, the detecting unit 1 is vertically connected or mounted on the upper portion of the second reaction vessel position of the reaction unit 10, so that the whole apparatus space can be more fully utilized and the overall size can be reduced. The other units and test protocols of the fifth and sixth embodiments are the same as or similar to those of the embodiment 1, and will not be repeated again.

Figure 13:
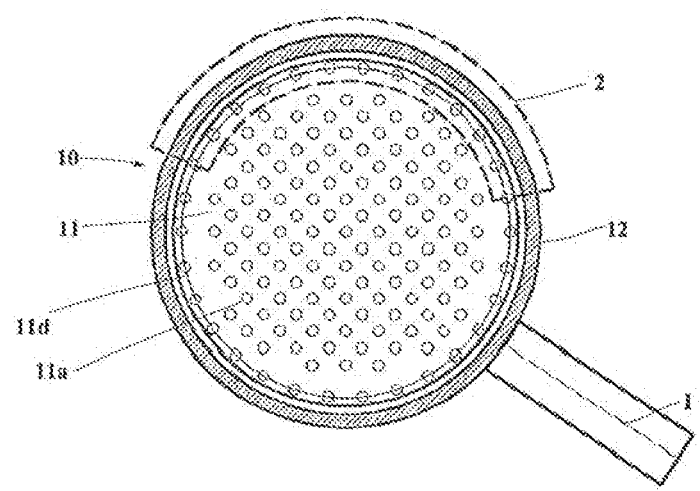
FIG. 13 is a schematic diagram of a reaction unit according to a second embodiment of the present invention.
Figure 14:
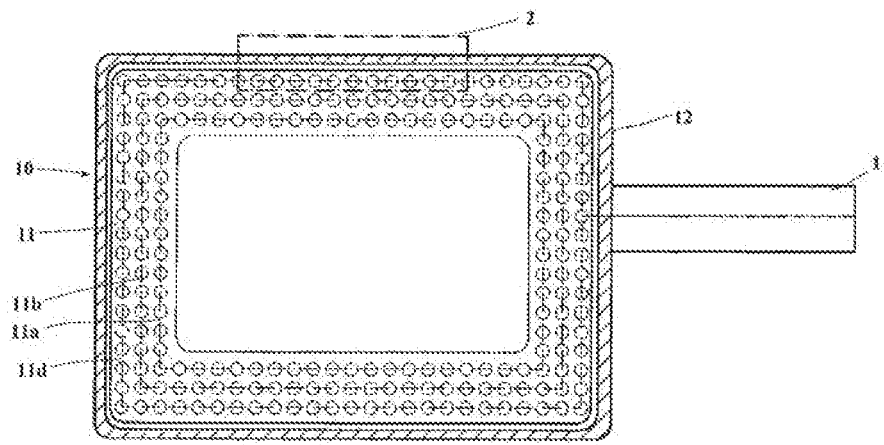
FIG. 14 is a schematic diagram of a reaction unit according to a third embodiment of the present invention.

The reaction unit in the apparatus of the disclosure has many embodiments in addition to the above-mentioned embodiments. FIGS. 13 and 14 are schematic diagrams of the second and third embodiment of the reaction unit of the apparatus of the present invention. In the second embodiment of the reaction unit, the reaction tray 11 of the reaction unit 10 includes a first reaction vessel position zone 11d and a second reaction vessel position zone 11a. The first reaction vessel position zone 11d is located at the outer edge of the reaction tray, and is at least one circle of the reaction vessel position centered on the central axis of the reaction tray. The second reaction vessel position zone is intensively distributed in a region on the reaction unit rather than the first reaction vessel position zone. In the embodiment of the reaction unit, the second reaction vessel position zone 11a is located on the inner side of the reaction tray and is distributed in a honeycomb shape, so as to fully utilize the space on the reaction unit 10, dispose more first reaction vessel positions, accommodate more reaction vessels, and increase the test throughput. The reaction unit is not limited to the shape of the tray, but may be other shape or configuration such as a rail or a rectangle. In a third embodiment of the reaction unit, referring to FIG. 14, the reaction unit is rectangular in shape. Similarly, the reaction unit includes a rotating apparatus 11 and a heat preservation apparatus 12. The rotating apparatus 11 includes a first reaction vessel position zone 11d, a second reaction vessel position zone 11a and 11b, and the first reaction vessel position transfers the reaction vessel to the B/F unit 2 and the detecting unit 1, the second reaction vessel position implement a major incubation.

The invention also provides an automatic analysis apparatus including a dispensing unit configured to dispense a sample or/and a reagent to a reaction vessel; a reaction unit configured to incubate the reactants in the reaction vessel and transfer the reaction vessel, a B/F unit configured to wash the reactant in the reaction vessel, a detecting unit configured to detect a reaction signal in the reaction vessel. The reaction unit includes a rotating apparatus, the rotating apparatus is provided with a reaction vessel position for carrying and fixing the reaction vessel; and the reaction vessel position includes a first reaction vessel position and a second reaction vessel position. The first reaction vessel position carries the reaction vessel forward to the B/F unit, the second reaction vessel position incubates a reactant in a reaction vessel including a reaction vessel which needs incubating twice. The B/F unit washes the reactants in the reaction vessel on the first reaction vessel position. The detecting unit includes a detecting position independent from the reaction unit, and the detecting unit detects the reaction signal in the reaction vessel located in the detecting location.

Figure 15:
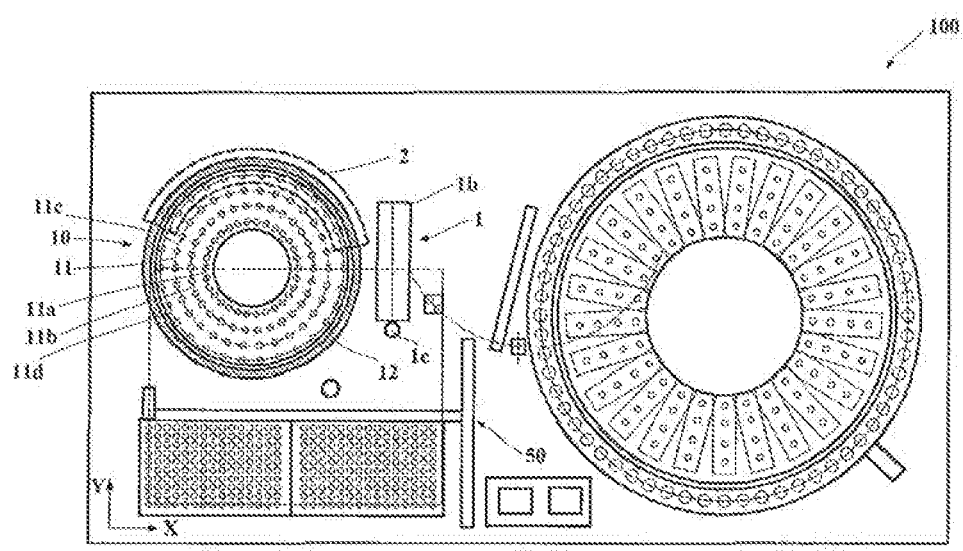
FIG. 15 is a schematic diagram of an automatic analysis apparatus according to a seventh embodiment of the present invention.

FIG. 15 is a schematic diagram of a seventh embodiment of the automatic analysis apparatus of the present invention. The greatest difference between this embodiment and the previous embodiment is that the detecting unit detects the signal in the reaction vessel located in the detecting position independent from the reaction unit, rather than directly detecting the signal in the reaction vessel on the first reaction vessel position on the reaction unit. The detecting unit 1 of the automatic analysis apparatus 100 includes a detecting body 1b and a detecting position 1c which is independent from the reaction unit, and the transferring of the reaction vessel between the detecting position 1c and the first reaction vessel position of the reaction unit is implemented by the transferring unit 50. In order to easily shield light, the detecting position 1c can be made into a fixed position, and the inlet and outlet of the reaction vessel are provided with a "skylight" mechanism, which is normally closed to ensure the darkroom environment of the detecting unit, and is opened when the reaction vessel enters and exits. The detecting position can also be made into a moving position. In order to easily shield light, the detecting position may be moved away from or close to the detecting body 1b in the form of a push-pull drawer or the like. Of course, the detecting position and the corresponding light-shielding structure can be other suitable implementing mode. In addition, the dispensing of the signal reagent can also be completed in the detecting position 1c. In addition to the advantages of the first embodiment of the automatic analysis apparatus, the embodiment can also make the detecting unit 1 relatively independent, so as to easily implement the closed darkroom environment during detecting, and the reaction unit is not required to further provide a light-shielding structure specially for the detecting unit 1. The other units of the automatic analysis apparatus 100 are the same as those of the automatic analysis apparatus in the embodiment 1. The test flow and steps of this embodiment are described with reference to FIGS. 5, 6, and 7, which are mainly different from the first embodiment of the automatic analysis apparatus in the last three steps of dispensing a signal reagent, detecting and discarding the reaction vessel, and the others are the same or similar. The step of dispensing a signal reagent of the first embodiment of the automatic analysis apparatus is completed on the second reaction vessel position on the reaction unit, and the step of dispensing the signal reagent in the embodiment may be completed on the second reaction vessel position on the reaction unit, or completed on the detecting position 1c; and the dispensing of the first signal reagent can be completed on the second reaction vessel position on the reaction unit, and the dispensing of the second signal reagent is completed at the detecting position 1c. In the detecting step, the transferring unit 50 transfers the reaction vessel to be detected from the second reaction vessel position on the reaction unit to the detecting position 1c, and the reaction signal in the reaction vessel at the detecting position is detected by the detecting unit. In the step of discarding the reaction vessel, the transferring unit 50 transfers the reaction vessel which has completed the detecting from the detecting position 1c to the discarding chute to discard. It should be understood by those skilled in the art that the embodiment and the various embodiments of the above-mentioned automatic analysis apparatus, as well as the various implementations and embodiments of the detecting unit and the reaction unit, may be combined or combined in any suitable manner.

The technical features or operational steps described in the embodiments of the present invention may be combined in any suitable manner. It should be easily understood by those skilled in the art that the order of the steps or actions in the methods described in the embodiments of the present invention can be changed. Therefore, unless other stated in a certain order, any order in the drawings or the detailed description is merely for the purpose of illustration and not a necessary order.

Various embodiments of the invention may include various steps, which may be embodied as apparatus-executable instructions that are executable by a general purpose or special purpose computer (or other electronic apparatus). Alternatively, these steps may be performed by hardware elements including specific logic circuitry for performing the steps or performed by the combination of the hardware, software and/or firmware.

The disclosure is described above through specific embodiments, but the disclosure is not limited to the specific embodiments. It should be apparent to those skilled in the art that various modifications, equivalents, changes, and the like may be made without departing from the spirit and scope of the disclosure. In addition, the "one embodiment", "this embodiment" and the like described above in various places represent different embodiments, and of course, all or part of them may be combined in one embodiment.

The above-mentioned embodiments are merely illustrative of several embodiments of the present invention, and the description thereof is more specific and detailed, but is not to be construed as limiting the scope of the invention. It should be noted that a number of variations and modifications may be made by those skilled in the art without departing from the spirit and scope of the invention. Therefore, the scope of the invention should be determined by the appended claims.

What is claimed is:

1. An automatic analysis apparatus, comprising:
   a dispensing unit configured to dispense a sample and/or a reagent into a reaction vessel;
   a reaction unit configured to incubate a reactant in the reaction vessel and transfer the reaction vessel;
   a bound-free (B/F) unit configured to wash the reactant in the reaction vessel;
   a detecting unit configured to detect a reaction signal in the reaction vessel;
   wherein the reaction unit comprises a rotating apparatus provided with reaction vessel positions to carry and fix the reaction vessel, the reaction vessel position comprises a first reaction vessel position and a second reaction vessel position, the first reaction vessel position carries the reaction vessel to the B/F unit and/or the detecting unit, the second reaction vessel position is configured to incubate the reactant in the reaction vessel, wherein the incubation of the reactant in the reaction vessel comprises a first incubation and a second incubation, the B/F unit is configured to wash the reactant in the reaction vessel on the first reaction vessel position, the detecting unit is configured to detect the reaction signal in the reaction vessel on the first reaction vessel position;
   a dispensing station independent from the reaction unit, wherein the dispensing unit completes the dispensing of the sample and/or the reactant in the dispensing station; and
   a transferring unit which can perform three-dimensional movement, the transferring unit including an X-direction movement manipulator, a Y-direction guide rail, a Y-direction movement mechanical arm, and a vertical movement mechanism and mechanical fingers, wherein the reaction vessel can be transferred by the transferring unit among the dispensing station, the first reaction vessel position on the reaction unit, and the second reaction vessel position on the reaction unit.

2. The automatic analysis apparatus according to claim 1, wherein the reaction unit is a reaction tray, the first reaction vessel positions are distributed on at least one circle centered on a rotation center of the reaction tray, the second reaction vessel positions are distributed on at least another circle centered on the rotation center of the reaction tray.

3. The automatic analysis apparatus according to claim 1, wherein the reaction unit is a reaction tray, the first reaction vessel positions are distributed on at least one circle centered on a rotation center of the reaction tray, the second reaction vessel positions are distributed in a region on the reaction tray other than the first reaction vessel positions.

* * * * *